(12) United States Patent
Lin et al.

(10) Patent No.: US 8,166,103 B2
(45) Date of Patent: Apr. 24, 2012

(54) APPARATUS FOR INTERPRETING IMAGE POSITION

(75) Inventors: Chih-Hsiung Lin, Sindian (TW); Yi-Ping Hung, Sijhih (TW)

(73) Assignee: Era Optoelectronics Inc., New Taipei (TW)

( * ) Notice: Subject to any disclaimer, the term of this patent is extended or adjusted under 35 U.S.C. 154(b) by 947 days.

(21) Appl. No.: 11/896,619

(22) Filed: Sep. 4, 2007

(65) Prior Publication Data
US 2010/0073474 A1    Mar. 25, 2010

(30) Foreign Application Priority Data
Sep. 8, 2006   (TW) ............................... 95133183 A

(51) Int. Cl.
*G06F 15/16*     (2006.01)
*H04N 7/18*      (2006.01)
(52) U.S. Cl. .................... 709/203; 345/156; 348/135
(58) Field of Classification Search .............. 709/203; 345/156, 184; 348/135
See application file for complete search history.

(56) References Cited

U.S. PATENT DOCUMENTS

2001/0020933 A1*  9/2001  Maggioni ............... 345/156
2002/0021287 A1*  2/2002  Tomasi et al. .......... 345/168

FOREIGN PATENT DOCUMENTS

CN           1811677 A       1/2005

* cited by examiner

*Primary Examiner* — Frantz Jean

(57) ABSTRACT

An apparatus for interpreting an image position is used for respectively reflecting an image of a target to a lens of at least one camera by means of first and second reflection mirrors to be respectively taken a photo as first and second images by the lenses. A microprocessor processes the first and the second images to obtain a relative coordinate value of a target in an operation plane range. A horizontal optical axis of at least one camera is parallel to the operation plane. Whereby, a position of an input zone touched by a user is interpreted more quickly so as to elevate the inputting efficiency of a data input device, and whether the user touches the input zone is interpreted more accurately so as to elevate the inputting accuracy of the data input device.

13 Claims, 3 Drawing Sheets

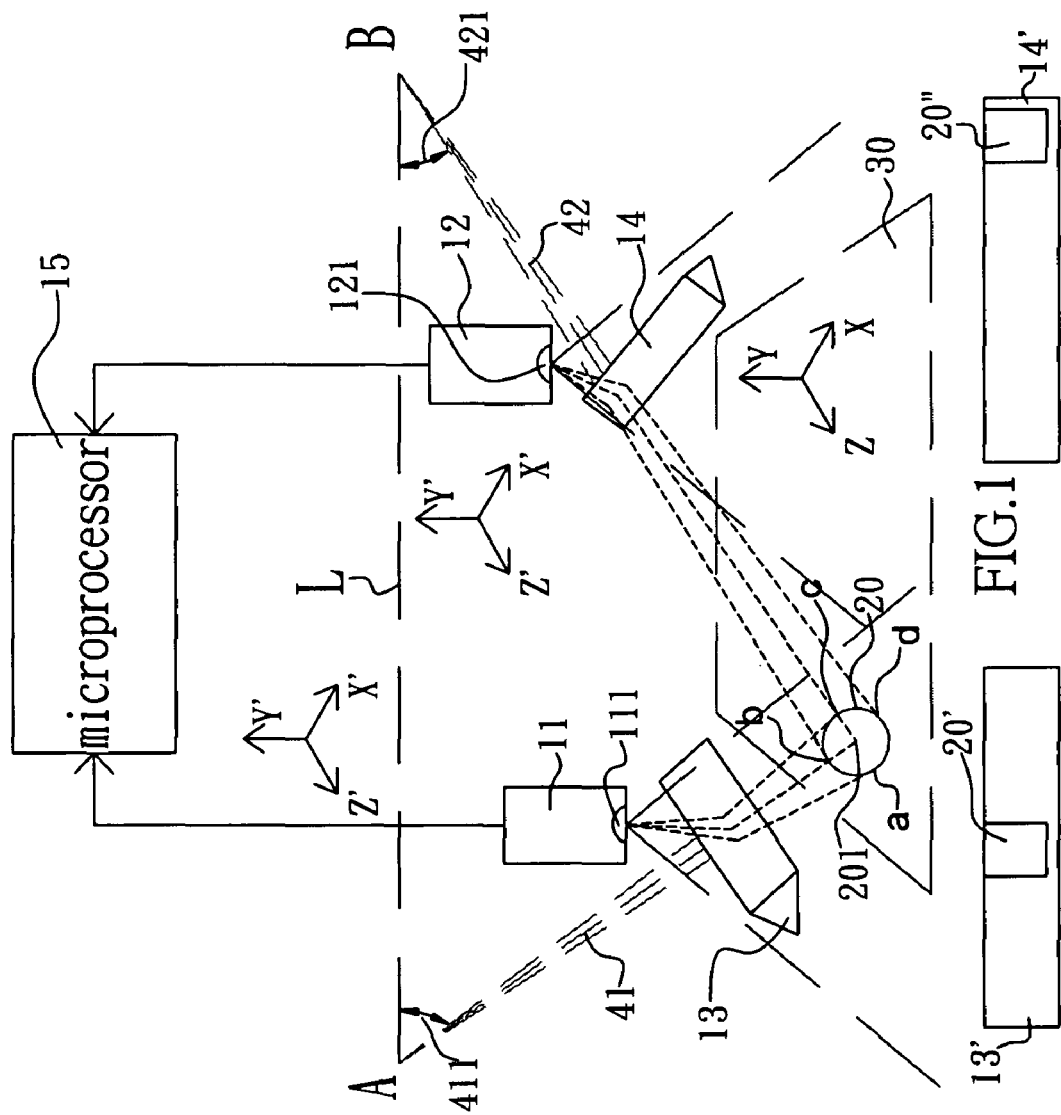

APPARATUS FOR INTERPRETING IMAGE POSITION

BACKGROUND OF THE INVENTION

1. Field of the Invention

The present invention relates to an apparatus for interpreting an image position, and more particularly to an apparatus for interpreting an image position in a data input device.

2. Description of Related Art

U.S. Pat. No. 6,650,318 entitled as "Data Input Device" discloses utilizing a data input device to generate optical images to allow a user to input data; utilizing a sensor to sense an operation state at which a user touches at least one input zone in the optical images; utilizing a processor to be electrically connected to the sensor to covert the operation that the user touches at least one input zone to corresponding input signals.

For allowing a data input device to generate input data corresponding to input operation of a user more accurately and more quickly and saving more production cost, United States Patent Publication No. 20060158435 entitled as "Data Input Device" applied by the applicant of the present invention comprises a microprocessor electrically connected to a camera device, a mirror installed in front of a lens of the camera device to allow the camera device to take a reference image reflected by the mirror. When the microprocessor detects that the camera device takes that a user touches the reference image in at least one input zone of an image, it then generates a corresponding input signal according to that the camera device takes that the user touches input images in at least one input zone.

SUMMARY OF THE INVENTION

For allowing a data input device to interpret a position on an input zone touched by a user more quickly, the present invention is proposed.

The main object of the present invention is to provide an apparatus for interpreting an image position, capable of interpreting a position on an input zone touched by a user more quickly so as to elevate the inputting efficiency of a data input device.

Another object of the present invention is to provide an apparatus for interpreting an image position, capable of interpreting more accurately whether a user touches an input zone so as to elevate the inputting accuracy of a data input device.

For attaining to the objects mentioned above, the present invention proposes an apparatus for interpreting an image position to obtain position information of a target; it comprises;

a camera, provided with a lens and used for taking a photo of an image;

a first reflection mirror, positioned inside a visual angle range of the camera and used for reflecting an image of a target to the lens to be taken a photo as a first image in a image of a first reflection mirror;

a second reflection mirror, positioned inside a visual angle range of the camera and used for reflecting an image of a target to the lens to be taken a photo as a second image in a image of a second reflection mirror; and a microprocessor, electrically connected with the camera and used for processing the first and the second images taken a photo by the camera to take an operational analysis to obtain a corresponding coordinate value in a operation plane range;

wherein, a horizontal optical axis of the camera is parallel to the operation plane, i.e. a x'z' plane of a coordinate system of the camera is parallel to a xz plane at which the operation plane is located, it can interpret a location on an input zone touched by a user more quickly so as to elevate the inputting efficiency of a data input device and interpret more accurately whether the user touches the input zone to elevate the inputting accuracy of the data input device.

BRIEF DESCRIPTION OF THE DRAWINGS

The present invention can be more fully understood by reference to the following description and accompanying drawings, in which:

FIG. 1 is a schematic view, showing a data input device of a first preferred embodiment according to the present invention;

FIG. 2A is a schematic view, showing a first digital camera taking a picture of an image of a first reflection mirror according to the present invention;

FIG. 2B is a schematic view, showing a second digital camera taking a picture of an image of a second reflection mirror according to the present invention;

DETAILED DESCRIPTION OF THE PREFERRED EMBODIMENTS

Figure 3:
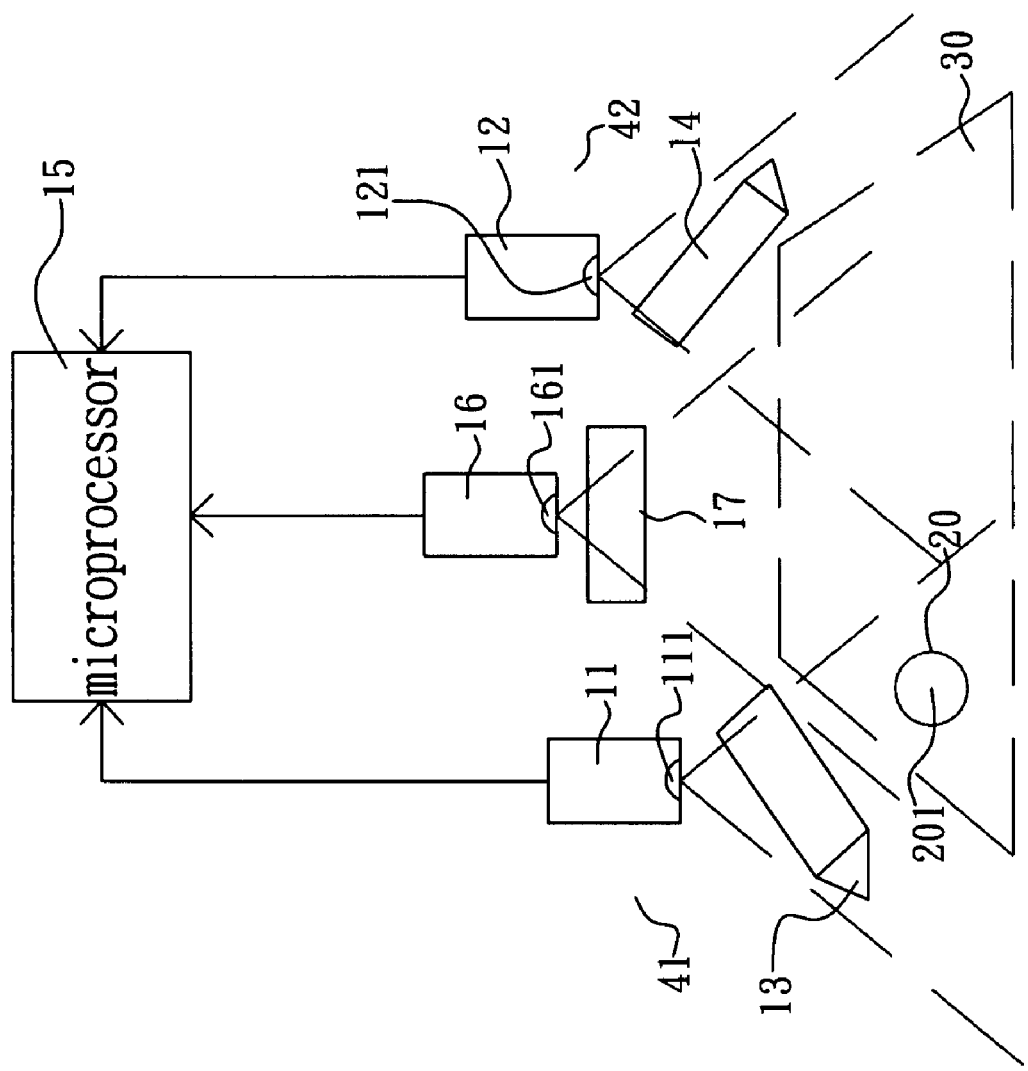
FIG. 3 is a schematic view, showing a data input device of a second preferred embodiment according to the present invention.

Please refer to FIGS. 1, 2A and 2B. An apparatus for interpreting an image position according to the present invention is allowed to use a camera to take a photo of a target image to obtain position information of a target quickly. An apparatus of a first preferred embodiment according to the present invention comprises a first camera 11, a second camera 12, a first reflection mirror 13, a second reflection mirror 14 and a microprocessor 15.

The first camera 11 is provided with a first lens 111 and used for taking a photo of an image.

The second camera 12 is provided with a second lens 121 and used for taking a photo of an image; the second camera 121 and the first camera 111 can be at a same horizontal plane or is not at a same horizontal plane.

The first reflection mirror 13 is positioned in a visual range of the first lens 111 and used for reflecting an image of a target 20 by the first lens 111 to the first lens 111 to be taken a photo to be a first image 20' in an image 13' of the first reflection mirror 13.

The second reflection mirror 14 is positioned in a visual range of the second lens 121 and used for reflecting an image of a target 20 to the second lens 121 to be taken a photo by the second lens 121 to be a second image 20" in an image 14' of the second reflection mirror 14.

The microprocessor 15 is respectively electrically connected with the first and the second cameras 11 and 12 to process the first and the second images 20' and 20" taken a photo by the first and the second cameras 11 and 12 to obtain a relative three-dimensional coordinate value of the target 20 in a range of an operation plane 30 by means of operational analysis; the microprocessor 15 can also be a central processing unit in a general computer.

Furthermore, horizontal axes of the first and the second cameras 11 and 12 are respectively parallel to the operation plane 30, i.e. x'z' planes of coordinate systems of the first and the second cameras 11 and 12 are parallel to a xz plane at which the operation plane 30 is located to allow the first and the second camera 11 and 12 only to be able to respectively take a photo of the images 13' and 14' reflected by the first and the second reflection mirrors 13 and 14 and being from the operation plane 30 to a upper side thereof in a very short distance range, i.e. the stripe-shaped images shown in FIGS. 2A and 2B.

The first and the second cameras 11 and 12 respectively take a photo of the first and the second images 20' and 20" of the target 20 reflected by the first and the second reflection mirrors 13 and 14 and respectively displayed in the images 13' and 14'.

The light beams projected on the first reflection mirror 13 from points a and b of the target 20 can respectively virtually extended to intersect at point A behind the first reflection mirror 13. The light beams projected on the second reflection mirror 14 from points c and d of the target 20 can respectively virtually extended to intersect at point B behind the second reflection mirror 14. The points A and B can be linked to be a virtual straight line L.

Taking the points b and c of the target 20 as an example, the light beam projected onto the first reflection mirror 13 from the point b and an virtually extended line 41 is formed a first included angle 411 with the virtual straight line L; the light beam projected onto the second reflection mirror 14 from the point c and an virtually extended line 42 is formed a second included angle 421 with the virtual straight line L. The light beam projected onto the first reflection mirror 13 from the point b and the light beam projected onto the second reflection mirror 14 from the point c are respectively virtually extended to a central point of the target 20. If the length of the virtual straight line L and the values of the first and the second included angle are known, it can then calculate to know the relative value of the central point 201 of the target 20 at the xz plane.

Furthermore, the values of the first and the second included angles 411 and 421 respectively have the relationship with level distances from the first and the second images 20' and 20" in the images 13' and 14' to reference points of the images 13' and 14'. For example, when the first included angle 411 is larger than the second included angle 421 as FIG. 1 shows, the level distance of the first image is larger than the level distance of the second image 20" as FIGS. 2A and 2B show. The reference points can respectively be one end or the central point of the images 13' and 14'.

The corresponding relationships between the value of the first included angle 411 and the level distances of the first image 20' and between the value of the second included angle 421 and the level distances of the second image 20" can be obtained by means of a theoretical calculation or practical test, and the corresponding relationship between a relative coordinate value of the target 20 on the xz plane and level distances of the first and the second images 20' and 20" can be obtained. Therefore, the relative coordinate value of the target 20 on the xz plane can be obtained by analyzing the level distances of the first and the second images 20' and 20" of the target 20.

A relative Y coordinate value of a lower end of the target can then be known by analyzing relative vertical distances between at least one of the first and second images 20' and 20" and bottoms of the images 13' and 14' of the first and the second reflection mirrors 13 and 14.

Please refer to FIG. 3. An apparatus for interpreting a target position of a second preferred embodiment according to the present invention further comprises a third camera 16 and a third reflection mirror 17 besides the first and the second cameras 11 and 12, the first and the second reflection mirrors 13 and 14, and the microprocessor 15 mentioned above, in which the disposition state among the first, the second and third cameras 11, 12 and 16 and the first, the second and the third reflection mirrors 13, 14 and 17, and the connection state of the first, the second and the third cameras 11, 12 and 16 and the microprocessor 15 are the same as what is described in the first embodiment. The third camera 16 has a third lens 161. The first, the second and the third cameras 11, 12 and 16 can respectively take a photo of the first, the second and third images by means of the first, the second and the third reflection mirrors 13, 14 and 17. Similar to what is described in the first embodiment, choosing any two of the images taken a photo by cameras to analyze can then obtain a relative coordination of the target 20; it can also attain to the same effect. But, the first, the second and the third cameras 11, 12 and 16 can disposed along a straight line or not along a straight line. If the first, the second and the third cameras 11, 12 and 16 are not disposed along a straight but with a triangular arrangement, they can take a photo of the images of a plurality of targets with different angles to enable the targets not to block one another to prevent the image from not being taken a photo.

Figures 4, 5A, 5B:
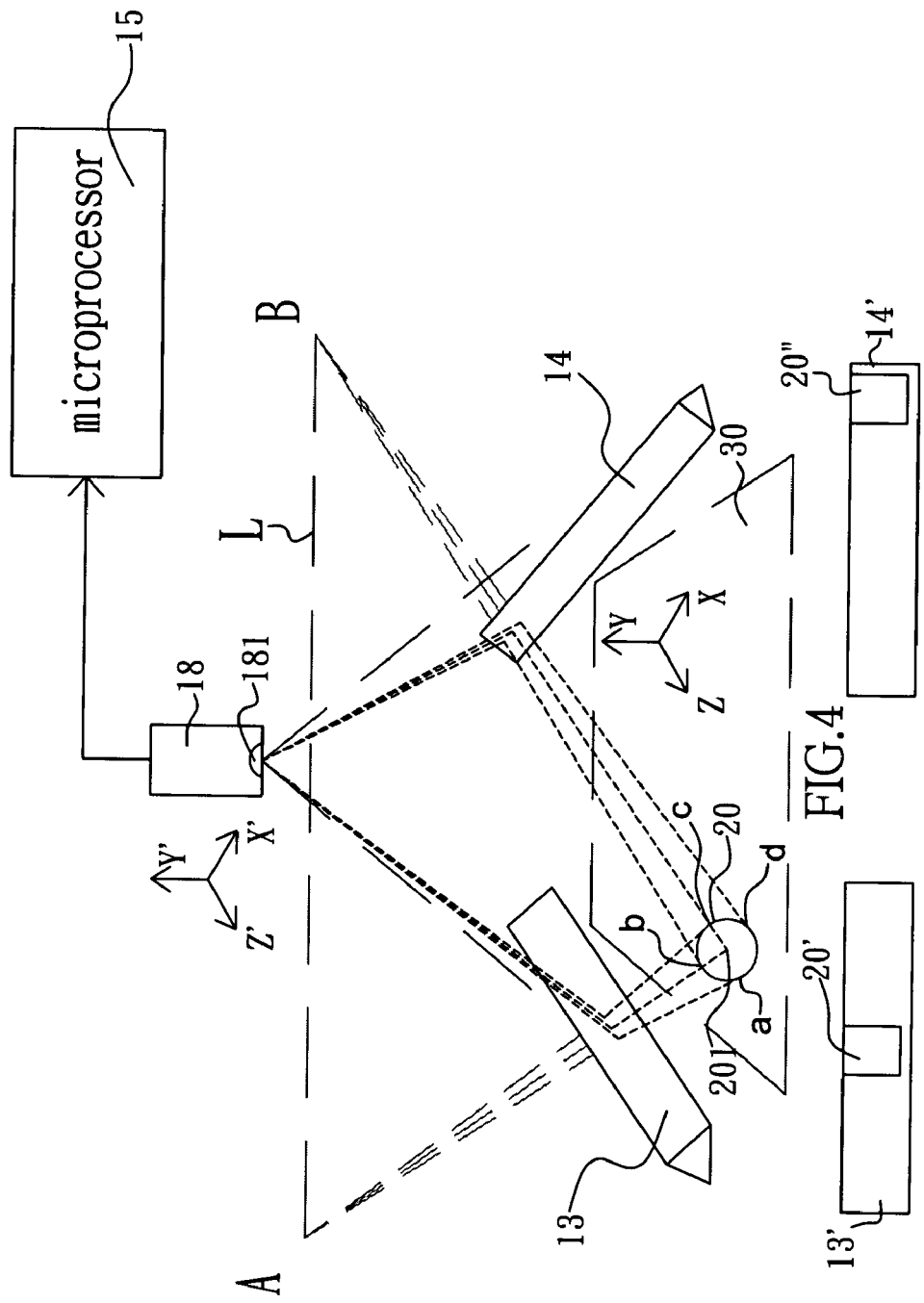
FIG. 4 is a schematic view, showing a data input device of a third preferred embodiment according to the present invention.
FIG. 5A is a schematic view, showing a fourth digital camera taking a picture of an image of a first reflection mirror according to the present invention.
FIG. 5B is a schematic view, showing a fourth digital camera taking a picture of an image of a second reflection mirror according to the present invention

Please refer to FIGS. 4, 5A and 5B. An apparatus for interpreting an image position of a third preferred embodiment according to the present invention comprises a fourth camera 18, a first reflection mirror 13, a second reflection mirror 14 and a microprocessor 15.

The fourth camera 18 is provided with a fourth lens 181 and used for taking a photo of an image.

The first reflection mirror 13 is positioned in a visual range of the fourth lens 181 and used for reflecting an image of a target 20 to the fourth lens 181 to be taken a photo by the fourth lens 181 to be a first image 20' in an image 13' of the first reflection mirror 13.

The second reflection mirror 14 is positioned in a visual range of the fourth lens 181 and used for reflecting an image of a target 20 to the fourth lens 181 to be taken a photo by the fourth lens 181 to be a second image 20" in an image 14' of the second reflection mirror 14.

The microprocessor 15 is electrically connected with the fourth camera 18 to process the first and the second images 20' and 20" taken a photo by the fourth camera 18 to obtain a three-dimensional relative coordinate value of the target 20 by means of operational analysis; the microprocessor 15 can also be a central processing unit in a general computer.

Furthermore, a horizontal axis of the fourth camera 18 is parallel to a operation plane 30, i.e. x'z' plane of a coordinate system of the fourth camera 18 is parallel to a xz plane at which the operation plane 30 is located to allow the fourth camera 18 only to be able to respectively take a photo of the images 13' and 14' reflected by the first and the second reflection mirrors 13 and 14 and being from the operation plane 30 to a upper side thereof in a very short distance range, i.e. the strip-shaped images shown in FIGS. 5A and 5B. The fourth camera 18 respectively takes a photo of the first and the second images 20' and 20" of the target 20 reflected by the first and the second reflection mirrors 13 and 14 and respectively displayed in the images 13' and 14'.

Similar to what is described in the first embodiment, in the present embodiment, the relative coordinate value of the target 20 on the xz plane can also be obtained by analyzing the level distances of the first and the second images 20' and 20" of the target 20. A relative Y coordinate value of a lower end of the target can then be known by analyzing relative vertical distances between at least one image of the first and second images 20' and 20" and bottoms of the images 13' and 14' of the first and the second reflection mirrors 13 and 14.

The first, the second or the third reflection mirrors 13, 14 and 17 mentioned above can be a plane mirror, a convex mirror or a concave mirror.

The target 20 mentioned above can be a finger of a user or a stick-typed article.

From the description mentioned above, an apparatus for interpreting an image position according to the present invention can interpret a position on input zone touched by a user more quickly so as to elevate the input efficiency of data input device, and can interpret whether a user touches the input zone more accurately so as to elevate the inputting accuracy of the input data device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for interpreting an image position, using cameras to take a photo of an image so as to obtain a position of a target, comprising:
   a first camera provided with a first lens and used for taking a photo of an image;
   a second camera provided with a second lens and used for taking a photo of an image;
   a first reflection mirror positioned in a visual angle range of said first lens, and used for reflecting an image of a target to said first lens to be taken a photo by said first lens as a first image in an image of said first reflection mirror;
   a second reflection mirror positioned in a visual angle range of said second lens, and used for reflecting an image of the target to said second lens to be taken a photo by said second lens as a second image in an image of said second reflection mirror; and
   a microprocessor electrically connected with said first and said second cameras, and used for processing said first and said second images respectively and obtaining a relative coordinate of said target in a range of an operation plane by means of operational analysis;
   wherein said first and said second cameras have a horizontal axis respectively parallel to said operation plane; that is, a coordinate system, which is corresponding to said first and second cameras respectively, has an x'z' plane, and a coordinate system, which is corresponding to said operation plane, has an xz plane at which said operation plane is located being parallel to the x'z' plane;
   wherein said microprocessor relies on analyzing a level distance between said first and second images relative to images of said first and second reflection mirrors taken a photo by said lenses to obtain a relative coordinate value of said target on said xz plane.

2. The apparatus according to claim 1, wherein said first and said second cameras only take a photo of an image reflected by said first and said second reflection mirrors respectfully and disposed in a range from said operation plane to a very short distance above said operation plane.

3. The apparatus according to claim 1, wherein said microprocessor relies on analyzing perpendicular distances between at least one of said first and said second images relative to bottoms of images of said first and said second reflection mirrors to obtain a relative Y coordinate value of a lower end of said target.

4. The apparatus according to claim 1, wherein said first or said second reflection mirror is a plane mirror, a convex mirror or a concave mirror.

5. The apparatus according to claim 1, further comprising a third camera and a third reflection mirror; said third camera being provided with a third lens; said third reflection mirror being located in a visual angle range of said third lens, and being used for reflecting an image of said target to said third mirror to be taken a photo as a third image in an image of said reflection mirror by said third lens; said microprocessor being electrically connected to said third camera to be used for processing said third image taken a photo by said third camera and combining one image chosen from said first and said second images to do an operational analysis to obtain a relative coordinate value of said target in a range of the operation plane; wherein
   a horizontal optical axis of said third camera is parallel to said operation plane;
   a further coordinate system, which is corresponding to said third camera, has an x'z' plane parallel to the xz plane.

6. The apparatus according to claim 5, wherein said first, said second and said third cameras only respectively take a photo of images reflected by said first, said second and said third reflection mirrors and being disposed in a range from said operation plane to a very short distance above said operation plane.

7. The apparatus according to claim 5, wherein said microprocessor relies on analyzing level distances between at least two images of said first, said second and said third images respectively relative to images of said first, said second and said third reflection mirrors taken a photo by said lenses to obtain a relative coordinate value of said target on said xz plane.

8. The apparatus according to claim 5, wherein said microprocessor relies on analyzing perpendicular distances between at least one of said first, said second and third images relative to bottoms of images of said first and said second reflection mirrors to obtain a relative Y coordinate value of a lower end of said target.

9. The apparatus according to claim 5, wherein said first, said second or said third reflection mirror is a plane mirror, a convex mirror or a concave mirror.

10. An apparatus for interpreting an image position, using cameras to take a photo of an image so as to obtain a position of a target, comprising:
   a camera provided with a lens and used for taking a photo of an image;
   a first reflection mirror positioned in a visual angle range of said lens, and used for reflecting an image of a target to said lens to be taken a photo by said lens as a first image in an image of said first reflection mirror;
   a second reflection mirror positioned in a visual angle range of said lens, and used for reflecting an image of the target to said lens to be taken a photo by said lens as a second image in an image of said second reflection mirror; and
   a microprocessor electrically connected with said camera, and used for processing said first and said second images respectively and obtaining a relative coordinate of said target in a range of an operation plane by means of operational analysis;

wherein said fourth camera has a horizontal optical axis parallel to said operation plane; that is, a coordinate system, which is corresponding to said camera, has a x'z', and a coordinate system, which is corresponding to the operation plane, has an xz plane at which said operation plane is located being parallel to the x'z' plane;

wherein said microprocessor relies on analyzing a level distance between said first and said second images relative to images of said first and said second reflection mirrors taken a photo by said lens to obtain a relative coordinate value of said target on said xz plane.

11. The apparatus according to claim 10, wherein said camera only respectively takes a photo of an image reflected by said first and said second reflection mirrors and being disposed in a range from said operation plane to a very short distance above said operation plane.

12. The apparatus according to claim 10, wherein said microprocessor relies on analyzing perpendicular distances between at least one of said first and said second images relative to bottoms of images of said first and said second reflection mirrors to obtain a relative Y coordinate value of a lower end of said target.

13. The apparatus according to claim 10, wherein said first or said second reflection mirror is a plane mirror, a convex mirror or a concave mirror.

\* \* \* \* \*